(12) United States Patent
Saito et al.

(10) Patent No.: US 8,857,998 B2
(45) Date of Patent: Oct. 14, 2014

(54) LIGHT SOURCE DEVICE AND PROJECTOR

(75) Inventors: Masahiro Saito, Nagano-ken (JP);
Keisuke Sakagami, Nagano-ken (JP);
Takahiro Miyata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 172 days.

(21) Appl. No.: 13/035,491

(22) Filed: Feb. 25, 2011

(65) Prior Publication Data

US 2011/0216285 A1 Sep. 8, 2011

(30) Foreign Application Priority Data

Mar. 3, 2010 (JP) ................................ 2010-046289

(51) Int. Cl.
*G03B 21/18* (2006.01)
*G03B 21/16* (2006.01)
*B60Q 1/06* (2006.01)
*F21V 29/00* (2006.01)
*H01J 7/24* (2006.01)

(52) U.S. Cl.
CPC ................ *F21V 29/00* (2013.01); *G03B 21/16* (2013.01); *H01J 7/24* (2013.01)
USPC ........................................... 353/61; 362/373

(58) Field of Classification Search
CPC .... G03B 21/16; G03B 21/20; G03B 21/2026; G03B 21/145; G03B 21/2086; G03B 21/2093; F21V 29/02; F21V 29/025; F21V 29/027; F21V 15/011; F21V 7/20; H04N 9/3144
USPC .................. 353/57, 58, 60, 61, 52, 119, 122; 49/104, 142, 143, 144, 145, 150, 164; 362/294, 345, 373
See application file for complete search history.

(56) References Cited

U.S. PATENT DOCUMENTS

| | | | |
|---|---|---|---|
| 2004/0145896 A1* | 7/2004 | Watanabe et al. | ............. 362/294 |
| 2010/0026966 A1 | 2/2010 | Nakano | |
| 2010/0103382 A1 | 4/2010 | Onodera et al. | |

FOREIGN PATENT DOCUMENTS

| | | | |
|---|---|---|---|
| JP | 2002-298639 A | | 10/2002 |
| JP | 2004-185977 A | | 7/2004 |
| JP | 2006-091132 A | | 4/2006 |
| JP | 2006-243635 A | | 9/2006 |
| JP | 2009099269 A | * | 5/2009 |
| JP | 2010-038976 A | | 2/2010 |
| JP | 2010-107574 A | | 5/2010 |

* cited by examiner

*Primary Examiner* — William C Dowling
*Assistant Examiner* — Ryan Howard

(57) ABSTRACT

A light source device includes: a light emission portion; a cooling channel configured to guide air toward the light emission portion; a rotational member disposed within the cooling channel in such a condition as to be rotatable around a predetermined rotation shaft by gravity, and configured to switch the cooling channel to a first channel branched from the cooling channel in the downstream when the light source device is set in a first position, and to a second channel different from the first channel when the light source device is set in a second position, wherein a position of the center of gravity of the rotational member is located at a position shifted from the center between the rotation shaft and an end of the rotational member away from the rotation shaft toward the end.

8 Claims, 6 Drawing Sheets

LIGHT SOURCE DEVICE AND PROJECTOR

CROSS-REFERENCE TO RELATED APPLICATION

The present application claims priority on and incorporates by reference in its entirety, Japanese Patent Application No. 2010-046289, filed Mar. 3, 2010.

BACKGROUND

1. Technical Field

The present invention relates to a light source device and a projector.

2. Related Art

In many cases, a light source device of a projector is constituted by a discharge light emission type light source device which induces discharges between a pair of electrodes for light emission.

More specifically, this type of light source device includes an arc tube which has a substantially spherical light emission portion containing a discharge space inside, and a pair of sealing portions extending in directions away from each other from both ends of the light emission portion. During lighting of the arc tube, the upper part of the light emission portion has the highest temperature, and the lower part of the light emission portion has the lowest temperature.

When this high-temperature condition of the upper part of the light emission portion continues, the transparency of the light emission portion easily decreases. Moreover, when the temperature difference between the upper part and the lower part increases, blacking of the light emission portion easily occurs. For avoiding these problems, the upper part of the light emission portion needs to be efficiently cooled.

As a technology capable of meeting this requirement, a projector which supplies cooling air to the upper part of the light emission portion to efficiently cool the upper part of the light emission portion has been proposed (for example, see JP-A-2006-91132).

According to the projector (projection apparatus) disclosed in JP-A-2006-91132, a channel of cooling air provided on the projector is controlled by a rotational member (cooling air guide plate) such that cooling air can be supplied to the upper part of the light emission portion (upper surface of discharge lamp) in either the normal position (normal installation) or the suspended position (suspended installation) of the projector.

JP-A-2006-91132 also discloses a structure which controls the channel of cooling air such that cooling air can be supplied to the upper part of the light emission portion in either the normal position or the suspended position of the projector by rotation of the rotational member rotatable by gravity (see JP-A-2006-91132, FIG. 3 and others).

According to the structure which rotates the rotational member by gravity, however, the channel of cooling air is insufficiently controlled when the rotational member is too small to obtain enough gravity torque for rotation. In this case, the upper part of the light emission portion is not efficiently cooled, which leads to deterioration of the arc tube and prevents elongation of the life of the arc tube.

As a method for overcoming these drawbacks, there is an idea that the rotational member is rotated by a force other than gravity (for example, see JP-A-2006-91132, FIGS. 6 and 8 and others). In this case, however, another mechanism which controls the channel of cooling air (control mechanism using a spring or the like) needs to be added to the rotational member, which increases the size of the light source device.

SUMMARY

An advantage of some aspects of the invention is to provide a light source device and a projector capable of achieving elongation of life and size reduction.

A light source device according to an aspect of the invention includes: an arc tube that has a light emission portion containing a pair of electrodes; a cooling channel that has a downstream part branched into a first channel and a second channel, and configured to guide air toward the light emission portion via the first channel or the second channel; a rotational member disposed within the cooling channel in such a condition as to be rotatable around a predetermined rotation shaft by gravity, and configured to switch the cooling channel to the first channel when the light source device is set in a first position, and to the second channel when the light source device is set in a second position different from the first position. A position of the center of gravity of the rotational member is located at a position shifted from the center between the rotation shaft and an end of the rotational member away from the rotation shaft toward the end.

When the light source device according to this aspect of the invention is included in a projector, the position of the light source device in the projector in the normal position may correspond to the first position, for example. In this case, the position of the light source device in the projector in the suspended condition may correspond to the second position.

According to this aspect of the invention, a position of the center of gravity of the rotational member is located at a position shifted toward the end from the center between the rotation shaft and the end. In this case, the rotational member obtains sufficient gravity torque for rotation even when the rotational member is small, which allows the rotational member to smoothly rotate by gravity. Thus, the channel of cooling air can be securely controlled when the position of the light source device is switched from the first position to the second position, or from the second position to the first position. For example, when the first channel and the second channel are provided such that air can be guided toward the upper part of the light emission portion regardless of whether the light source device is in the first position or the second position, the upper part of the light emission portion can be efficiently cooled.

In this case, the upper part of the light emission portion can be securely cooled in each position without using a spring or the like even when the rotational member is small. Accordingly, elongation of the life and size reduction of the light source device can be achieved.

It is preferable that the rotational member is shaped such that the width of the rotational member in the direction parallel with the rotation shaft decreases in the direction from the end toward the rotation shaft in the above aspect of the invention.

According to this structure, the rotational member is shaped such that the width of the rotational member in the direction parallel with the rotation shaft decreases in the direction from the end toward the rotation shaft (more specifically, the rotational member has a triangular shape, a trapezoidal shape or other shapes). In this case, the position of the center of gravity can be disposed at a position shifted toward the end from the center between the rotation shaft and the end only by shaping the rotational member from a plate body having a uniform thickness into the above shape. Thus, the rotational member can be easily manufactured.

It is preferable that the light source device of the above aspect of the invention further includes: a housing that has an opening connecting with the inside and the outside of the housing and communicating with the first channel and the second channel, and accommodates the arc tube; and a duct which forms a part of the cooling channel and connects with the outside surface of the housing to guide the outside air toward the opening. In this case, the rotational member is disposed within the duct in such a position that the rotation shaft is located close to the opening, and that the end is located away from the opening. The duct is shaped such that the channel width decreases in the direction toward the opening in accordance with the shape of the rotational member.

According to this structure, the rotational member is disposed within the duct such that the rotation shaft is located close to the opening and that the end is located away from the opening. Also, the duct is shaped such that the channel width decreases in the direction toward the opening in accordance with the shape of the rotational member. In this case, the flowing speed of air flowing through the duct from the end toward the opening increases, which improves the cooling efficiency.

It is preferable that the first position corresponds to the position of the light source device disposed upside down to the second position in the above aspect of the invention. In this case, the opening extends in the horizontal direction with respect to the center axis of the arc tube under the condition in which the light source device is set in the first position or the second position.

According to this structure, the opening extends in the horizontal direction with respect to the center axis of the arc tube. In this case, the necessity of drawing the duct along the housing is eliminated, which allows air having a high flowing speed to be introduced into the housing. Thus, the cooling efficiency increases. Moreover, since the duct need not be drawn around, size reduction of the light source device can be achieved.

A projector according to another aspect of the invention includes the light source device of the above aspect.

According to this aspect of the invention, the projector includes the light source device of the above aspect. Thus, advantages similar to those of the light source device can be provided in this aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment according to the invention is hereinafter described with reference to the drawings.

Structure of Projector

Figure 1:
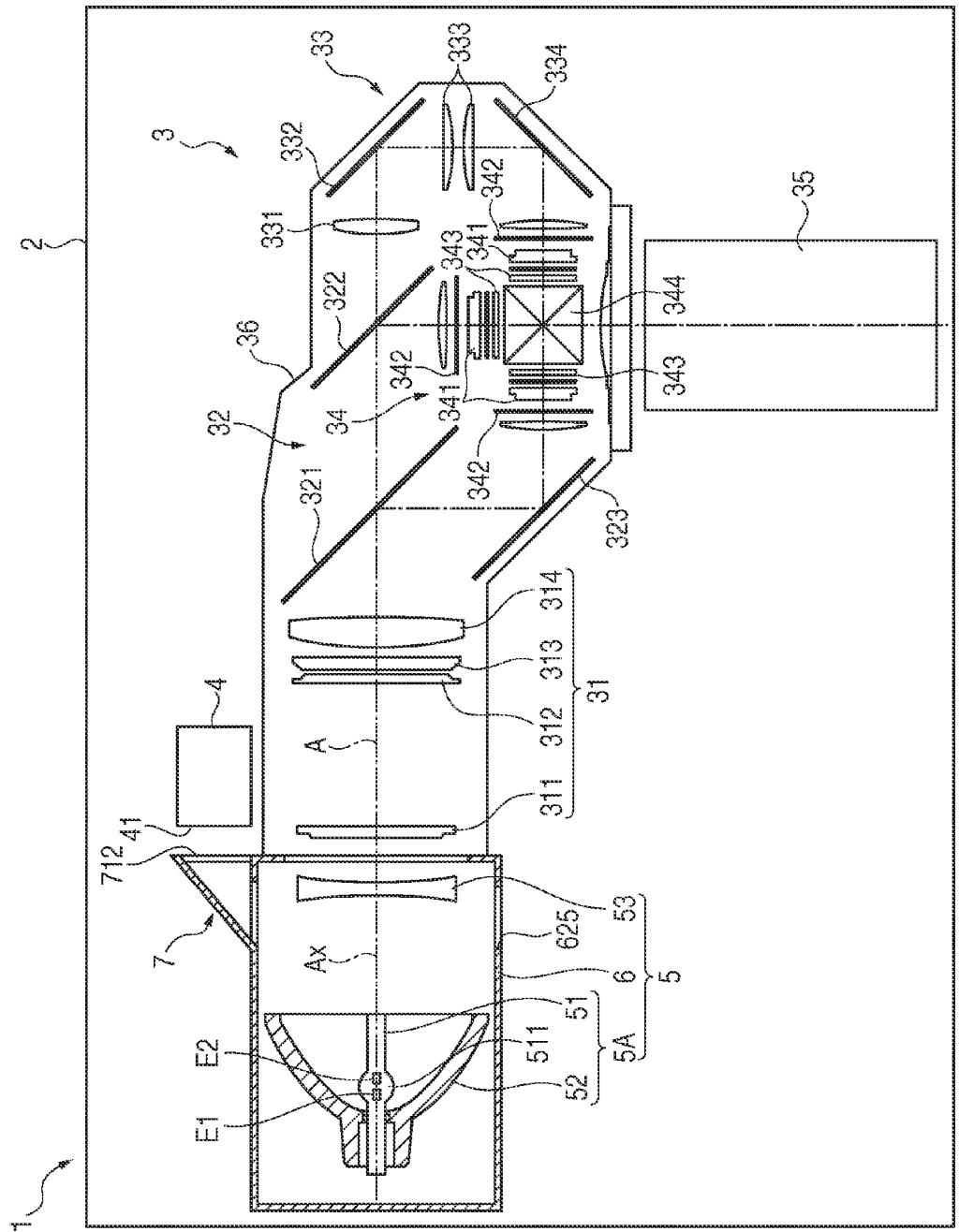
FIG. 1 schematically illustrates the structure of a projector according to an embodiment.

FIG. 1 illustrates the general structure of a projector 1 according to this embodiment.

The projector 1 forms an image corresponding to image information and projects the image on a screen (not shown). As illustrated in FIG. 1, the projector 1 chiefly includes an external housing 2 constituting an external case, an optical unit 3 provided within the external housing 2, and a cooling fan 4.

Structure of Optical Unit

The optical unit 3 forms an image corresponding to image information (image signal) under the control of a control device (not shown).

As illustrated in FIG. 1, the optical unit 3 includes: a light source device 5; an illumination device 31 which contains lens arrays 311 and 312, a polarization converting element 313, and a superposing lens 314; a color separating optical device 32 which contains dichroic mirrors 321 and 322, and a reflection mirror 323; a relay optical device 33 which contains an entrance side lens 331, a relay leys 333, and reflection mirrors 332 and 334; an optical device 34 which contains three liquid crystal panels 341 as light modulation devices, three entrance side polarization plates 342, three emitting side polarization plates 343, and a dichroic prism 344 as a color combining optical device; a projection lens 35 as a projection optical device; and an optical component housing 36 which accommodates the respective optical components 31 through 34 at predetermined positions on an illumination optical axis A established within the optical component housing 36.

According to the optical unit 3 thus constructed, light emitted from the light source device 5 and passing through the illumination device 31 is separated into three color lights in R, G, and B by the color separating optical device 32. The separated color lights are modulated by the respective liquid crystal panels 341 in accordance with image information. The modulated color lights are combined by the dichroic prism 344 to produce an image to be projected on the screen by the projection lens 35.

The optical components 31 through 35 are constituted by optical systems included in various types of projectors generally available. Thus, these components 31 through 35 are not specifically explained, and only the structure of the light source device 5 is discussed herein.

Structure of Light Source Device

As illustrated in FIG. 1, the light source device 5 includes a light source device main body 5A which has an arc tube 51 and a reflection mirror 52, a collimating lens 53, a housing 6 in which the light source device main body 5A and the collimating lens 53 are accommodated, and a channel switching mechanism 7.

In the following description, the light emission side of the light source device 5 is referred to as the "front side", and the side opposite to the light emission side is referred to as the "rear side" for convenience of explanation. The "left" and the "right" in the following description correspond to the "left" and the "right", respectively, as viewed from the front side under the condition in which the projector 1 is installed in the normal position (this position of the light source device 5 corresponds to a first position in the appended claims) when not particularly specified. The "up" and the "down" in the following description correspond to the "up" and the "down", respectively, under the condition in which the projector 1 is installed in the normal position when not particularly specified.

FIGS. 2, 3, and 4A and 4B illustrate the structure of the light source device 5.

Figure 2:
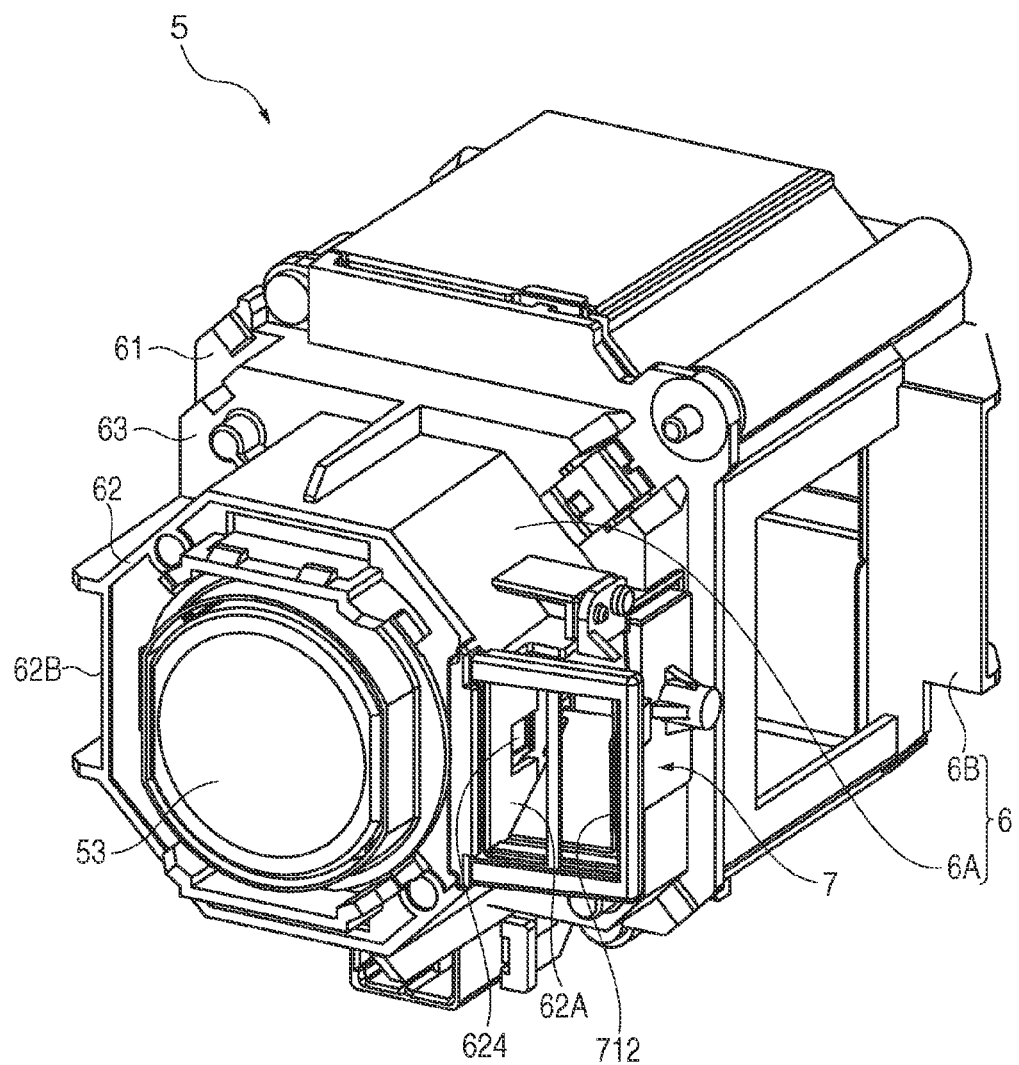
FIG. 2 is a perspective view of a light source device according to the embodiment.
Figure 3:
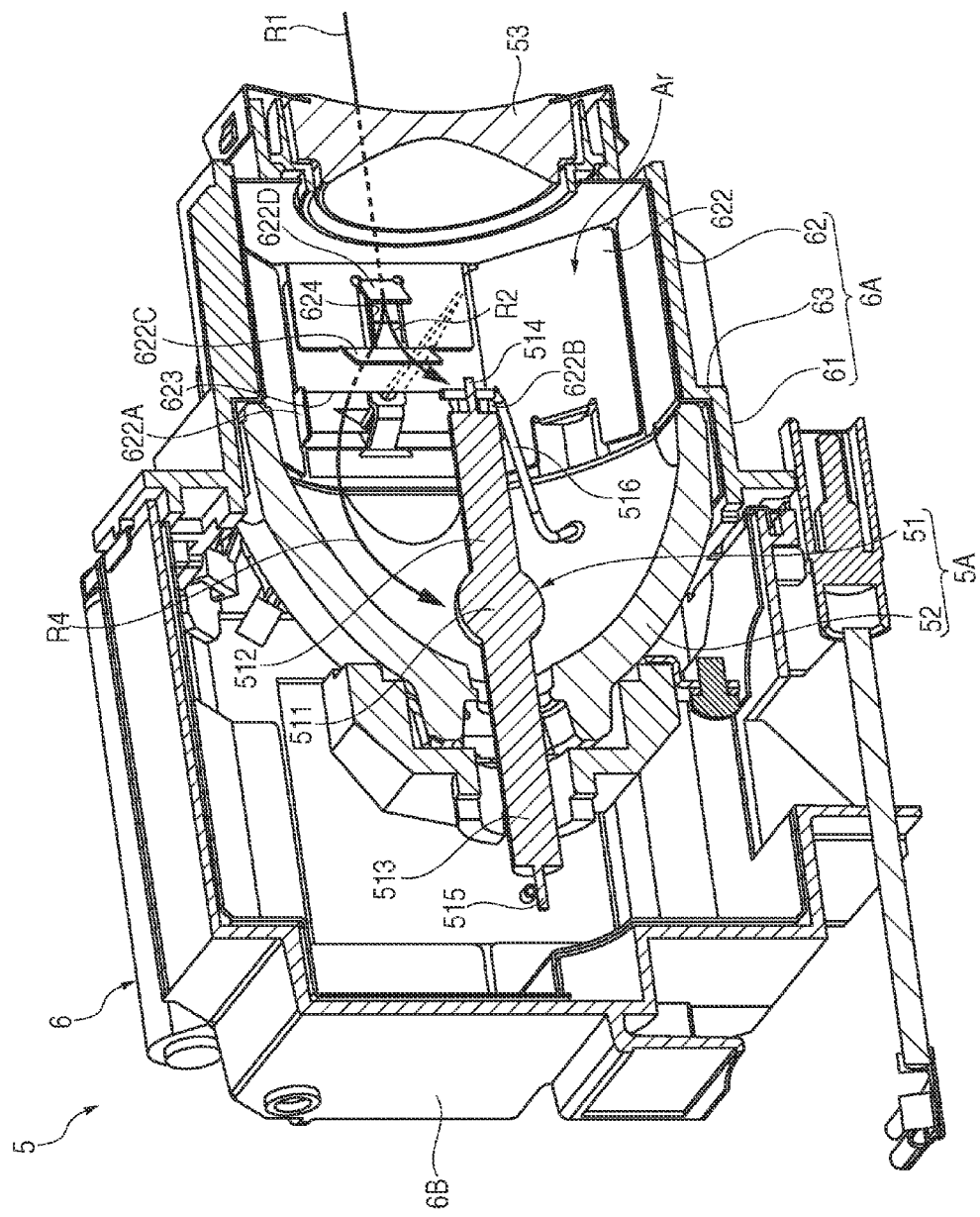
FIG. 3 is a cross-sectional view of the light source device according to the embodiment.
Figure 4A:
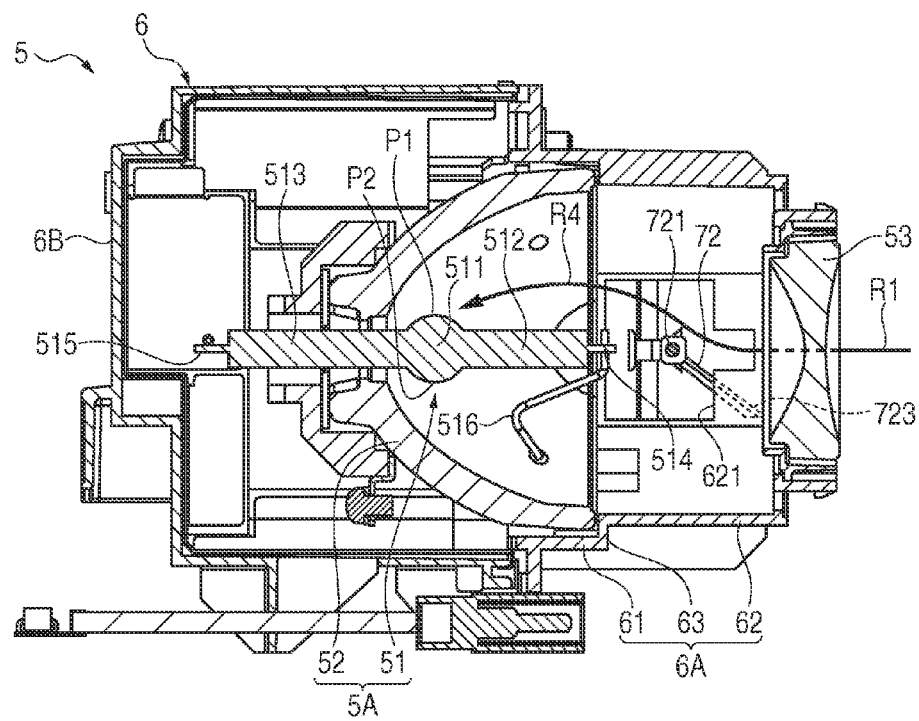
FIGS. 4A and 4B are cross-sectional views illustrating the operation of the light source device according to the embodiment.
Figure 4B:
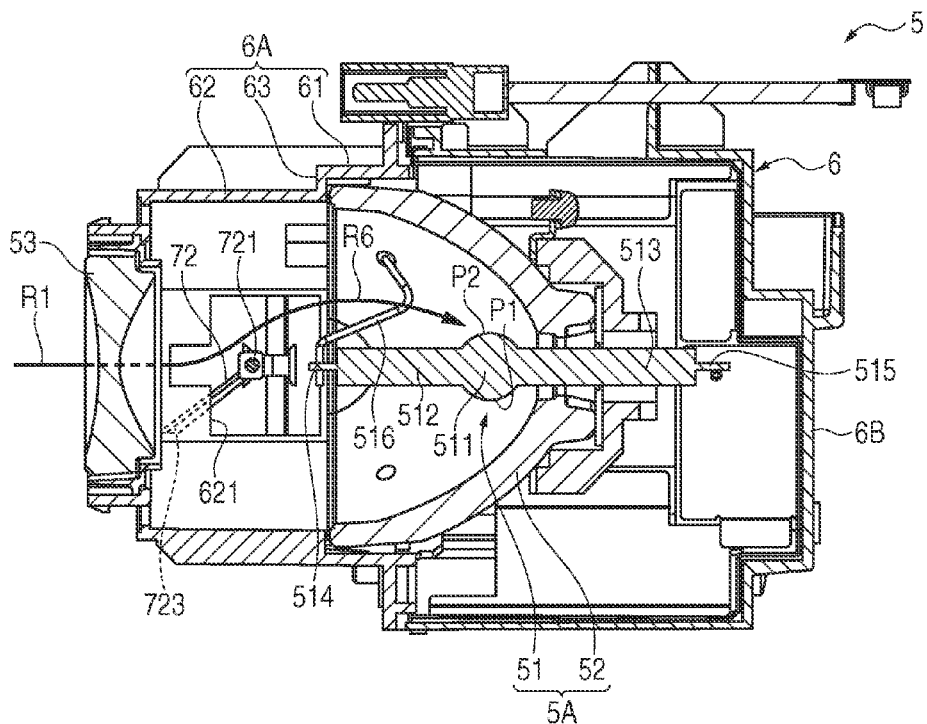

More specifically, FIG. 2 is a perspective view of the front side of the light source device 5 as viewed from the right, and FIG. 3 is a vertical cross-sectional view of the left side of the light source device 5 as viewed from the rear side. FIGS. 4A and 4B are vertical cross-sectional views illustrating the operation of the light source device 5. FIGS. 4A and 4B show the condition of the light source device 5 from which an inside wall member 622 (FIG. 3) described later is removed for convenience of explanation.

FIG. 2 shows the position condition of the light source device 5 when the projector 1 is installed in the normal position. The figures other than FIG. 4B show similar conditions of the projector 1. Thus, the upper side in FIG. 2 corresponds to the top surface side of the projector 1, and the lower side in FIG. 2 corresponds to the bottom side of the projector 1. FIG. 4A illustrates the light source device 5 when the projector 1 is installed in the normal position, while FIG. 4B illustrates the light source device 5 when the projector 1 is installed in the suspended condition (the projector 1 is positioned with the top surface facing downward and the bottom surface facing upward) (this position of the light source device 5 corresponds to a second position in the appended claims). Thus, the normal position of the light source device 5 corresponds to the position of the light source device 5 disposed upside down in the suspended position.

As illustrated in FIG. 3 and other figures, the arc tube 51 has a light emission portion 511 expanded in a substantially spherical shape, and a pair of sealing portions 512 and 513 between which the light emission portion 511 is sandwiched as a pair of components extending in directions away from each other from both ends of the light emission portion 511.

A pair of electrodes E1 and E2 (FIG. 1) are provided within the light emission portion 511. A discharge space into which light emission substances containing mercury, rare gas and a small quantity of halogen are sealed is formed between the pair of the electrodes E1 and E2.

Electrode extension lines 514 and 515 extending to the outside of the arc tube 51 are connected with the ends of the sealing portions 512 and 513, respectively, on the sides opposite to the light emission portion 511. When voltage is applied to the electrode extension lines 514 and 515, light is emitted from the inside of the light emission portion 511.

A lead 516 connecting with a connector (not shown) provided outside the light source device 5 is welded to the electrode extension line 514 disposed on the sealing portion 512 on the front side such that voltage can be applied to the electrode 514.

The reflection mirror 52 reflects received light to converge the light on a predetermined focal position.

The collimating lens 53 collimates the light reflected by the reflection mirror 52 and releases the collimated light from the light source device 5.

The housing 6 supports the light source device main body 5A and the collimating lens 53 and combines these optical components 5A and 53 into one body. As illustrated in FIG. 2, the housing 6 has a cylindrical member 6A and a light shield member 6B.

As illustrated in FIG. 2, the light shield member 6B is attached to the rear side of the cylindrical member 6A to cover the rear side of the reflection mirror 52.

The cylindrical member 6A surrounds the arc tube 51, and extends along a center axis Ax of the arc tube 51 (center axis of light emitted from the light source device 5 in FIG. 1).

More specifically, the cylindrical member 6A has a first cylindrical portion 61 positioned on the rear side, and a second cylindrical portion 62 disposed on the front side as a cylindrical component whose external shape is smaller than that of the first cylindrical portion 61. The first cylindrical portion 61 and the second cylindrical portion 62 are combined into one body with a step 63 formed therebetween.

The light source device main body 5A is attached to the cylindrical member 6A in such a condition that the front end of the reflection mirror 52 expanded to have a substantially concave cross section contacts the step 63.

The collimating lens 53 is fixed to the front end of the second cylindrical portion 62.

Therefore, when the light source device main body 5A and the collimating lens 53 are fixed to the cylindrical member 6A in the manner described above, an opening of the second cylindrical portion 62 on the rear side is closed by the light source device main body 5A. Simultaneously, an opening of the second cylindrical portion 62 on the front side is closed by the collimating lens 53. As a result, a space Ar (FIG. 3) surrounded by the second cylindrical portion 62, the light source device main body 5A, and the collimating lens 53 is formed.

As illustrated in FIGS. 4A and 4B, an opening 621 (corresponding to an opening in the appended claims) connecting the inside and the outside is provided on a right side surface 62A of the second cylindrical portion 62. More specifically, the opening 621 provided on the second cylindrical portion 62 is so formed as to extend in the horizontal direction with respect to the center axis Ax of the arc tube 51.

As illustrated in FIG. 3, the inside wall member 622 is attached to the inside surface of the second cylindrical portion 62 in such a condition as to extend along the inside surface of the second cylindrical portion 62. The inside wall member 622 is one piece body formed by cutting and folding one plate body, and has a function of protecting the second cylindrical portion 62 from heat generated from the light source device main body 5A and other functions. The inside wall member 622 has a first introduction port 623 and a second introduction port 624 at positions overlapping with the opening 621. The first introduction port 623 is disposed on the rear part of the second cylindrical portion 62, while the second introduction port 624 is disposed at a position shifted toward the front from the first introduction port 623.

Guide plates 622A and 622B provided on the upper part and the lower part of the first introduction port 623, respectively, project toward the inside of the space Ar to guide air introduced through the first introduction port 623 toward the light emission portion 511 of the arc tube 51. Guide plates 622C and 622D provided on the front part and the rear part of the second introduction port 624, respectively, project toward the inside of the space Ar to guide air introduced through the second introduction port 624 toward the connection area between the electrode extension line 514 and the lead 516. The guide plates 622A through 622D are produced by folding the inside wall member 622.

As illustrated in FIG. 1, an outlet port 625 through which air within the space Ar is exhausted is formed on a left side surface 62B (FIG. 2) on the left part of the second cylindrical portion 62.

More specifically, the outlet port 625 has a rectangular shape in the plan view, and is disposed at a substantially central position of the left side surface 62B in the up-down direction and in such a position as to face to the opening 621.

Structure of Channel Switching Mechanism

Figure 5:
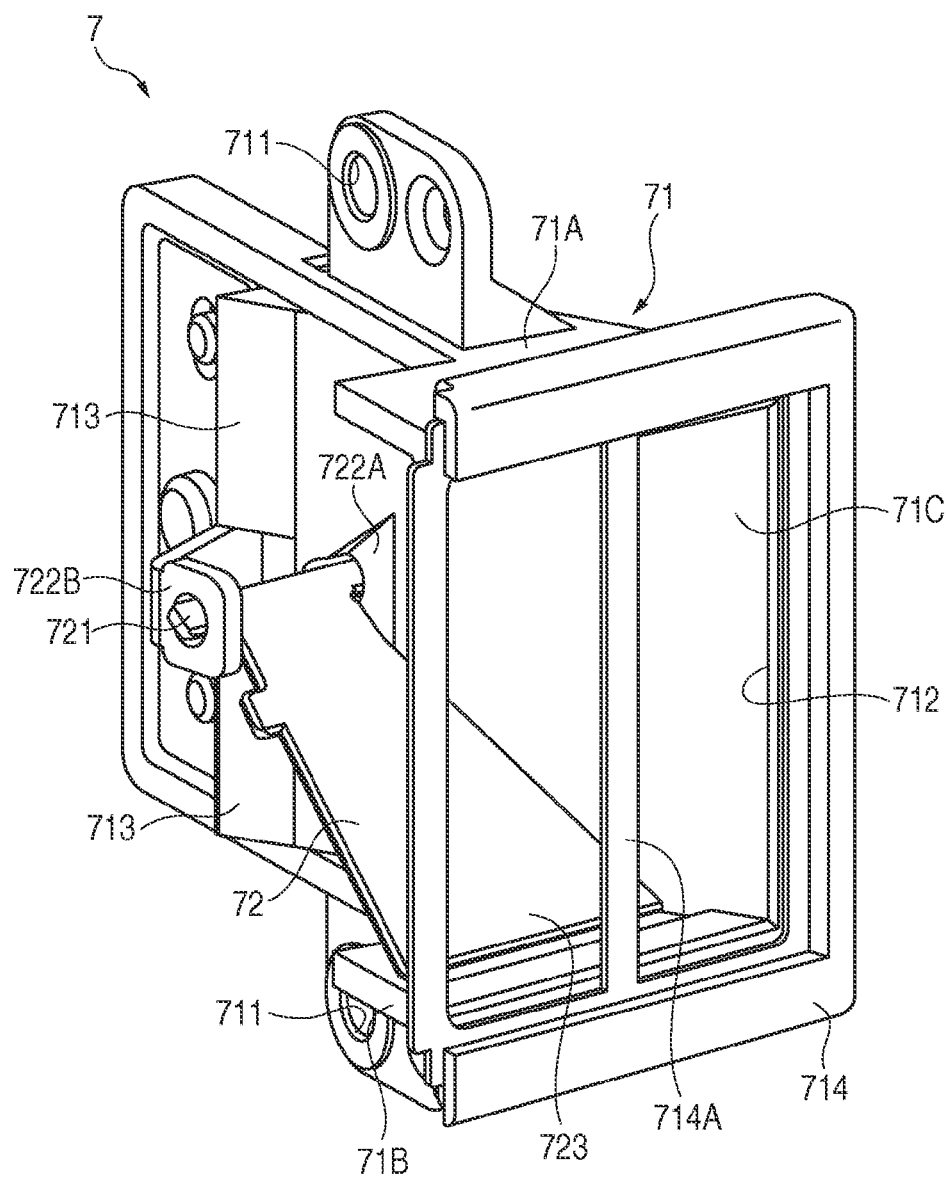
FIG. 5 is a perspective view of a channel switching mechanism according to the embodiment.

FIG. 5 illustrates the structure of the channel switching mechanism 7.

More specifically, FIG. 5 is a perspective view of the front side of the channel switching mechanism 7 as viewed from the left.

The channel switching mechanism 7 has a duct 71 and a rotational member 72.

The duct 71 constitutes a part of the channel of air for cooling the inside of the space Ar, and guides the outside air toward the opening 621. More specifically, the duct 71 has an upper surface 71A, a lower surface 71B, and a right surface 71C. The duct 71 is connected with the right side surface 62A of the second cylindrical portion 62 by a screw threaded through a screw hole 711, in which condition the left side of the duct 71 is closed by the right side surface 62A of the second cylindrical portion 62.

More specifically, the right surface 71C of the duct 71 is inclined in such a condition as to expand toward the front. In this arrangement, a channel narrowed in the direction from the front side where an air introduction portion 712 is provided toward the rear side (the side where the first introduction port 623 is disposed in the connected condition with the housing 6) can be formed in the duct 71.

The air introduction portion 712 is disposed opposed to a discharge port 41 of the cooling fan 4 (FIG. 1) to introduce air discharged from the cooling fan 4 into the duct 71 as cooling air. Thus, the air introduced through the air introduction portion 712 and flowing inside the duct 71 is guided through the first introduction port 623 and the second introduction port 624 into the space Ar.

The duct 71 has an inclined surface 713 disposed on the inner surface of the rear part of the right side 71C and inclined such that the air introduced from the first introduction port 623 toward the space Ar can travel toward the light emission portion 511 of the arc tube 51. As illustrated in FIG. 5, the duct 71 further has an attachment frame 714 formed along the air introduction portion 712. A protection member 714A having a mesh structure (not shown) for securing ventilation is attached to the attachment frame 714 to close the air introduction portion 712. The protection member 714A has a function of preventing scattering of fragments of the arc tube 51 when the arc tube 51 is broken and other functions.

The rotational member 72 is supported within the duct 71 in such a condition as to be rotatable by gravity. More specifically, the rotational member 72 is constituted by a trapezoidal plate, and has a rotation shaft 721 at one end corresponding to the upper side of the trapezoidal shape. The rotation shaft 721 is supported by supports 722A and 722B provided on the rear part of the duct 71 and in the substantially central area of the duct 71 in the up-down direction. An end 723 (corresponding to the lower side of the trapezoidal shape) of the rotational member 72 on the outer circumferential side of the rotation of the rotational member 72 is disposed on the front part of the duct 71. Thus, the rotational member 72 is supported rotatably in such a condition that the rotation shaft 721 is positioned on the opening 621 side (more specifically, on the first introduction port 623 side), and that the end 723 is positioned on the air introduction portion 712 side away from the opening 621.

According to this structure, the rotational member 72 is shaped such that the width of the rotational member 72 in the direction parallel with the rotation shaft 721 decreases in the direction from the end 723 toward the rotation shaft 721. As a result, the position of the center of gravity of the rotational member 72 is located at a position shifted toward the end 723 from the center between the rotation shaft 721 and the end 723 disposed away from the rotation shaft 721.

In this case, the inside space of the duct 71 is formed such that the channel width of the channel through which air is introduced into the space Ar decreases in the direction toward the opening 621 in accordance with the shape of the rotational member 72. This shape agreement between the duct 71 and the rotational member 72 allows the channel within the duct 71 to be narrowed, and prevents leakage of air through the clearance between the duct 71 and the rotational member 72.

When the projector 1 is installed in the normal position, the rotation of the rotational member 72 is regulated to produce a first condition shown in FIG. 4A. That is, the rotational member 72 rotates until the end 723 contacts the lower surface 71B by gravity. More specifically, when the projector 1 is installed in the normal position, the rotational member 72 opens a channel (corresponding to a first channel in the appended claims) on the upper side (top surface side of the projector 1), and closes a channel (corresponding to a second channel in the appended claims) on the lower side (bottom surface side of the projector 1) to receive the air introduced through the air introduction portion 712 by using the upper surface (surface on the top surface side) of the rotational member 72 and guide the air toward the upper area of the space Ar (toward the top surface) as illustrated in FIG. 4A.

On the other hand, when the projector 1 is installed in the suspended position, the rotation of the rotational member 72 is regulated to produce a second condition shown in FIG. 4B. That is, the rotational member 72 rotates until the end 723 contacts the upper surface 71A by gravity. More specifically, when the projector 1 is installed in the suspended position, the rotational member 72 closes the channel on the upper side (top surface side), and opens the channel on the lower side (bottom surface side) to receive the air introduced through the air introduction portion 712 by using the lower surface (surface on the bottom surface side) and guide the air toward the lower area of the space Ar (toward the bottom surface) as illustrated in FIG. 4B.

The channel through which air discharged from the cooling fan 4 passes to cool the arc tube 51 (cooling channel) is now described.

Air Channel

Figure 6:
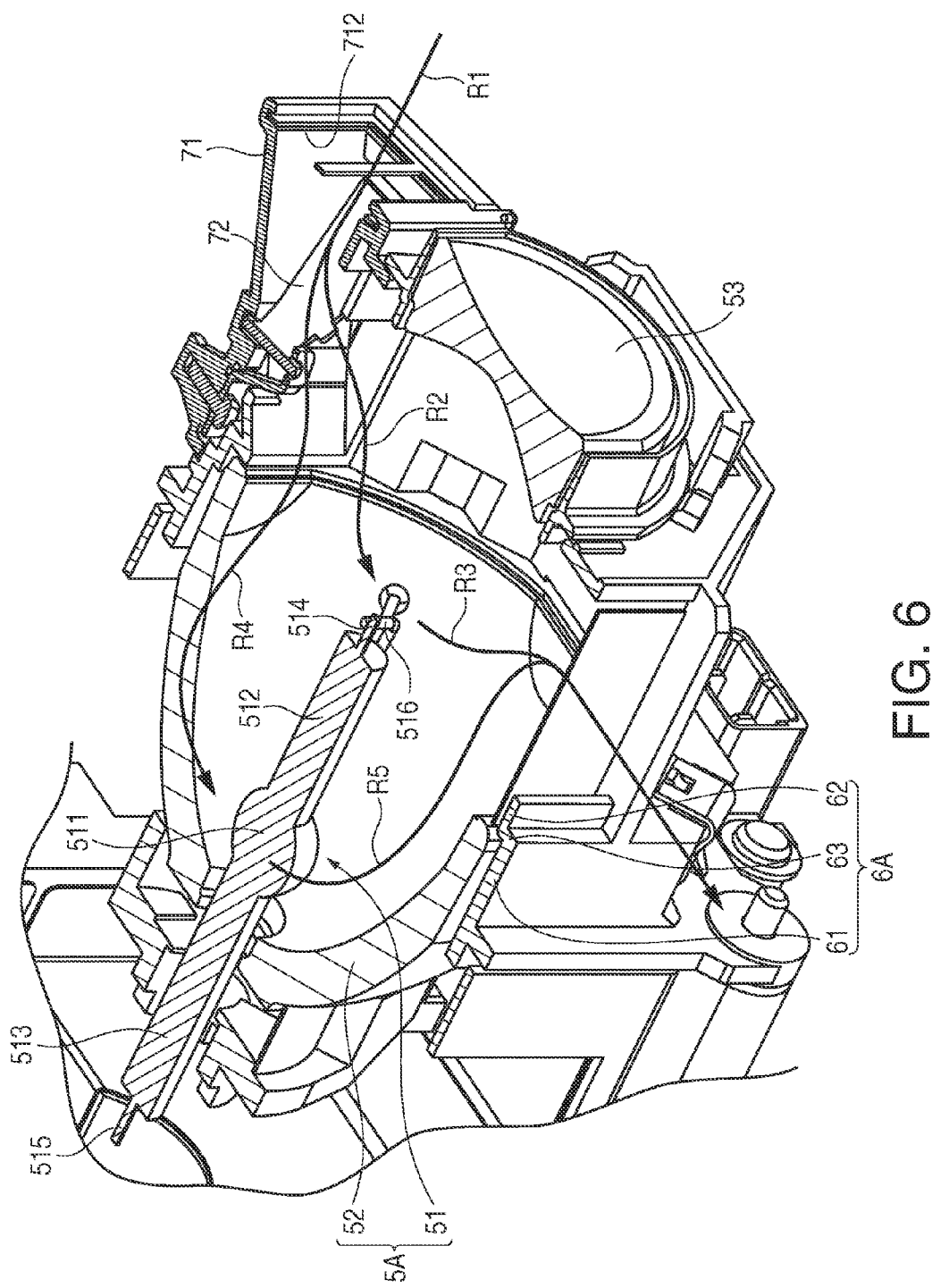
FIG. 6 is a cross-sectional view illustrating a cooling channel of the light source device according to the embodiment.

FIG. 6 is a cross-sectional view illustrating the cooling channel of the light source device 5. FIG. 6 shows the structure of the light source device 5 from which the inside wall member 622 is removed similarly to FIGS. 4A and 4B. As illustrated in FIGS. 3 and 6, the opening 621 of the housing 6 communicates with the upper channel and the lower channel described above via the first introduction port 623, and communicates with the channel of air for cooling the connection area between the electrode extension line 514 and the lead 516 via the second introduction port 624.

Initially, a third channel for cooling the connection area between the electrode extension line 514 and the lead 516 is explained.

Air discharged from the cooling fan 4 is introduced into the duct 71 via the air introduction portion 712 as indicated by an arrow R1 shown in FIG. 6 and other figures.

A part of air introduced into the duct 71 is guided into the space Ar through the second introduction port 624 as indicated by an arrow R2 shown in FIG. 6 and other figures. The air guided into the space Ar from the second introduction port 624 is supplied to the connection area between the electrode extension line 514 and the lead 516 for cooling thereat. This connection area is cooled to maintain preferable welded (connected) conditions between a metal foil inside the arc tube 51 and the electrode extension line 514 and between the electrode extension line 514 and the lead 516.

The air having cooled the connection area is exhausted to the outside of the second cylindrical portion 62 via the outlet port 625 (FIG. 1) as indicated by an arrow R3 shown in FIG. 6.

The connection area is cooled by the air flowing through the third channel (route from R1 through R2 toward R3) as well when the projector 1 is installed in the suspended position.

Next, a first channel and a second channel for cooling the light emission portion 511 of the arc tube 51 are explained. The light source device 5 having the structure described above includes a cooling channel for guiding the outside air toward the light emission portion 511 within the housing 6. The downstream part of the channel provided between the air introduction portion 712 and the light emission portion 511 (channel part after branching from the third channel) is divided into the upper channel and the lower channel mentioned above. As explained above, when the projector 1 is installed in the normal position, the first channel is opened with the second channel closed by the rotational member 72. On the other hand, when the projector 1 is installed in the suspended position, the second channel is opened with the first channel closed by the rotational member 72.

More specifically, in case of the normal position, the air introduced into the duct 71 flows toward the upper area of the space Ar while guided by the rotational member 72 as indicated by an arrow R4 shown in FIG. 6 and other figures, and is supplied toward an uppermost part P1 of the light emission portion 511 (FIG. 4A) to cool the upper part of the light emission portion 511.

The air having cooled the upper part of the light emission portion 511 is exhausted to the outside of the second cylindrical portion 62 through the outlet port 625 (FIG. 1) together with the air having cooled the connection area between the electrode extension line 514 and the lead 516 as indicated by an arrow R5 shown in FIG. 6.

Accordingly, under the normal position, the upper part of the light emission portion 511 is intensively cooled by the air flowing through the first channel (route from R1 through R4 toward R5).

On the other hand, in case of the suspended position, the air introduced into the duct 71 flows toward the lower part of the space Ar (upper area as viewed in the condition of the suspended position) while guided by the rotational member 72 as indicated by an arrow R6 shown in FIG. 4B, and is supplied toward a lowermost part P2 of the light emission portion 511 (uppermost part as viewed in the condition of the suspended position as the portion symmetrized with the upmost part P1 in the up-down direction) to cool the lower part (upper part in the suspended position) of the light emission portion 511.

The air having cooled the lower part of the light emission portion 511 is exhausted to the outside of the second cylindrical portion 62 as indicated by the arrow R5 in FIG. 6 similarly to the condition of the normal position.

Accordingly, the lower part of the light emission portion 511 is intensively cooled by the air flowing through the second channel (route from R1 through R6 to R5) in the suspended position.

According to this embodiment, the following advantages can be offered.

In this embodiment, the position of the center of gravity of the rotational member 72 is shifted toward the end 723 from the center between the rotation shaft 721 and the end 723. Thus, the rotational member 72 can obtain sufficient torque of gravity for rotation even when the rotational member is small. Accordingly, the rotational member 72 can smoothly rotate by gravity, and thus securely control the channel of the cooling air when the position of the light source device 5 is switched from the normal position to the suspended position or from the suspended position to the normal position. In this case, both the upper channel and the lower channel are formed such that air can be guided to the upper part of the light emission portion 511 regardless of whether the projector 1 is in the normal position or the suspended position. Thus, the upper part of the light emission portion 511 can be efficiently cooled in the respective positions of the projector 1.

Accordingly, the upper part of the light emission portion 511 in the respective positions can be securely cooled without using a spring or the like even when the rotational member 72 is small, which achieves elongation of life and size reduction of the light source device 5.

The rotational member 72 has a trapezoidal shape whose width in the direction parallel with the rotation shaft 721 decreases in the direction from the end 723 toward the rotation shaft 721. In this case, the position of the center of gravity of the rotational member 72 can be located at a position shifted toward the end 723 from the center between the rotation shaft 721 and the end 723 only by shaping a plate body having a uniform thickness into the shape described above. Thus, the rotational member 72 can be easily manufactured.

The rotational member 72 is provided inside the duct 71 in such a condition that the rotation shaft 721 is located on the opening 621 side where the first introduction port 623 and the second introduction port 624 are formed, and that the end 723 is located at a position away from the opening 621. In this case, the duct 71 is shaped such that the channel width decreases in the direction toward the opening 621 in accordance with the shape of the rotational member 72. According to this structure, the flowing speed of the air passing through the duct 71 from the end 723 toward the opening 621 increases, thereby improving the cooling efficiency for cooling the respective cooling targets.

The opening 621 is provided to extend in the horizontal direction with respect to the center axis Ax of the arc tube 51. In this case, the necessity of drawing the duct 71 along the housing 6 is eliminated, which allows air having a high flowing speed to be introduced into the housing 6. Thus, the cooling efficiency for cooling the respective cooling targets enhances. Moreover, since the duct 71 need not be drawn around, the size of the light source device 5 can be reduced.

Accordingly, the upper part of the light emission portion 511 can be effectively cooled in either the normal position or the suspended position of the projector 1, which lengthens the life of the arc tube 51.

According to the projector 1 which includes the light source device 5 having this structure, the life of the projector 1 itself becomes long, and the reliability of the projector 1 improves.

The invention is not limited to the embodiment described herein but may be practiced otherwise without departing from the scope of the invention. Therefore, modifications and improvements including the following changes may be made.

According to this embodiment, the rotational member 72 is constituted by a trapezoidal plate. However, the rotational member 72 may be a triangular plate or a fan-shaped plate, for example, instead of the trapezoidal plate. The structure of the rotational member 72 is not limited to the structure described in this embodiment but is only required to be constructed such that the position of the center of gravity is located at a position shifted toward the end 723 from the center between the rotation shaft 721 and the end 723. For example, the rotational member 72 may have a weight fixed to a position shifted toward the end 723 from the center, or may have a portion thicker than the center at a position shifted toward the end 723 from the center.

According to this embodiment, the first position corresponds to the normal position, and the second position corresponds to the suspended position. However, the first position and the second position may be other positions (such as an upward projection position for upward projection and a downward projection position for downward projection).

According to this embodiment, the projector 1 has the three liquid crystal panels 341. However, the invention is applicable to a projector including two or a smaller number of liquid crystal panels or four or a larger number of liquid crystal panels.

While the transmission type liquid crystal panels are used as the light modulation devices in this embodiment, reflection type liquid crystal panels may be employed. Alternatively, other types of light modulation device may be used as long as they can modulate light according to image information and form a corresponding image. For example, the invention is applicable to a projector including a light modulation device other than the liquid crystal type such as a device containing micromirrors. When this light modulation device is used, the entrance side and emitting side polarization plates 342 and 343 can be eliminated.

While only the front projection type projector has been discussed in this embodiment, the invention is applicable to a rear type projector which has a screen and projects images from the rear side of the screen.

The light source device having the long-life arc tube according to the invention can be included in a projector used for presentation or home theater, or can be incorporated in other devices.

What is claimed is:

1. A light source device comprising:
   an arc tube that has a light emission portion containing a pair of electrodes and electrode extension lines and leads;
   a cooling channel that has a downstream part branched into a first channel and a second channel, and configured to guide air toward the light emission portion via the first channel or the second channel;
   a rotational member disposed within the cooling channel in such a condition as to be rotatable around a predetermined rotation shaft by gravity, and configured to switch the cooling channel to the first channel when the light source device is set in a first position, and to switch the cooling channel to the second channel when the light source device is set in a second position different from the first position;
   a housing that accommodates the arc tube, the housing having a first opening communicating an inside of the housing with an outside of the housing and communicating with the first and second channels and a second opening communicating with a channel of air for cooling an area between the electrode extension lines and the leads;
   the second opening being disposed on a light emission side of the first opening; and
   a duct that forms a part of the cooling channel and connects with an outside surface of the housing to guide outside air toward the first and second openings, wherein
   the rotational member is shaped such that the width of the rotational member in the direction parallel to the rotation shaft decreases in a direction from an end disposed away from rotation shaft toward the rotation shaft,
   the rotational shaft is disposed on the first opening, and
   the duct is shaped such that the width of the cooling channel decreases in a direction toward the first opening in accordance with the shape of the rotational member.

2. The light source device according to claim 1, further comprising:
   a housing that has an opening connecting with the inside and the outside of the housing and communicating with the first channel and the second channel, and accommodates the arc tube; wherein
   the duct connects with the outside surface of the housing to guide the outside air toward the opening,
   the rotational member is disposed within the duct in such a position that the rotation shaft is located close to the opening, and that the end is located away from the opening, and
   the duct is shaped such that the channel width decreases in the direction toward the opening in accordance with the shape of the rotational member.

3. The light source device according to claim 2, wherein
   the first position corresponds to the position of the light source device disposed upside down to the second position; and
   the opening extends in the horizontal direction with respect to the center axis of the arc tube under the condition in which the light source device is set in the first position or the second position.

4. A projector comprising the light source device according to claim 1.

5. The projector according to claim 4, further comprising:
   a housing that has an opening connecting with the inside and the outside of the housing and communicating with the first channel and the second channel, and accommodates the arc tube; and
   a duct which forms a part of the cooling channel and connects with the outside surface of the housing to guide the outside air toward the opening, wherein
   the rotational member is disposed within the duct in such a position that the rotation shaft is located close to the opening, and that the end is located away from the opening, and
   the duct is shaped such that the channel width decreases in the direction toward the opening in accordance with the shape of the rotational member.

6. The projector according to claim 5, wherein
   the first position corresponds to the position of the light source device disposed upside down to the second position; and
   the opening extends in the horizontal direction with respect to the center axis of the arc tube under the condition in which the light source device is set in the first position or the second position.

7. The light source according to claim 2, further comprising:
   a plurality of electrodes to which voltage is applied to enable the light emission portion to emit light; and
   a third channel configured to guide air introduced through the opening toward at least one of the plurality of electrodes.

8. The projector according to claim 5, further comprising:
   a plurality of electrodes to which voltage is applied to enable the light emission portion to emit light; and
   a third channel configured to guide air introduced through the opening toward at least one of the plurality of electrodes.

* * * * *